United States Patent [19]

Weber, Jr. et al.

[11] Patent Number: 4,967,061
[45] Date of Patent: Oct. 30, 1990

[54] HEATED BASIN

[75] Inventors: Jaroy Weber, Jr., Woodside; Terrance L. Kloeckl, San Francisco; Michael A. Kast, Palo Alto; Frank T. Watkins, III, Menlo Park; Anthony Chan, Los Altos, all of Calif.

[73] Assignee: Sonne Medical, Inc., Palo Alto, Calif.

[21] Appl. No.: 418,542

[22] Filed: Oct. 10, 1989

[51] Int. Cl.$^5$ ............................................. H05B 3/72
[52] U.S. Cl. ..................................... 219/438; 219/521
[58] Field of Search .............. 219/436, 438, 437, 441, 219/521, 385, 386

[56] References Cited

U.S. PATENT DOCUMENTS

| | | | |
|---|---|---|---|
| 1,508,035 | 9/1924 | Underwood | 219/436 |
| 1,621,758 | 3/1927 | Shaw | 219/436 |
| 2,046,125 | 6/1936 | Lacy | 219/436 |
| 2,666,128 | 1/1954 | Crawford | 219/436 |
| 3,558,858 | 1/1971 | Luger | 219/211 |
| 3,869,596 | 3/1975 | Howie | 219/438 |
| 3,919,523 | 11/1975 | Wadia | 219/441 |
| 3,938,498 | 2/1976 | Price | 219/441 |
| 3,950,632 | 4/1976 | Rivelli | 219/441 |
| 4,356,385 | 10/1982 | Stein | 219/441 |
| 4,764,391 | 8/1988 | Wasserman | 99/279 |

FOREIGN PATENT DOCUMENTS 903495 12/1953 Fed. Rep. of Germany ...... 219/438
11454 1/1896 Switzerland ........................ 219/436

Primary Examiner—Teresa J. Walberg
Attorney, Agent, or Firm—A. C. Smith

[57] ABSTRACT

Apparatus for warming a sterile liquid includes a basin with a heater assembly, a base surrounding the basin, and an electronic temperature controller. The shape of the basin bottom includes an plateau-like elevated central region and a depressed surrounding rim. The heater assembly is of a thin-film type, and provides relatively greater heating in the central region than in the outer region. Both the heater geometry and the shape of the basin bottom promote a natural and uniform convective flow of the liquid to promote mixing of the warmer and cooler portions of the liquid. The temperature controller allows the user to select the temperature that the liquid is to be warmed to, and provides visual and aural indications of liquid or basin temperatures which exceed reasonable pre-set limits. The controller also halts the flow of electrical current to the heater assembly when an overtemperature problem in the liquid or the basin is detected. A disposable cable connects the temperature controller to the basin.

1 Claim, 4 Drawing Sheets

HEATED BASIN

BACKGROUND OF THE INVENTION

Field of the Invention

This invention relates to apparatus for the warming of liquid to a desired temperature. Specifically, in surgical operations, it is often desired to have a quantity of sterile solution available which is maintained at body temperature. Historically, this need has been addressed in a number of ways.

In a "passive" approach, a large cast-iron base for a heating element was provided on a standard open basin. The heating element was in contact with the bottom of the basin and with some portion of the side of the basin as well. A sterile drape was used to quarantine the heating element from the sterile basin. However, this approach suffered from a number of drawbacks. Because there was no way to ensure consistent thermal contact with the heating element, uneven heating and "hot spots" would develop. Secondly, because the boundary between the basin and the heater was not thermally efficient, the heating element had to be maintained at quite a high temperature if rapid warming was desired. This caused the heating element to become dangerously hot to the touch, and also resulted in significant overshooting of the target solution temperature. This approach also suffered from unpredictable temperature gradients within the solution and varying heating characteristics depending upon the amount of solution in the basin. A second passive approach involved a thin film heater assembly, specifically a simple circular "spot" heater located at the center of a standard basin. However, because the source of heat was relatively confined, the solution was warmed too slowly, produced unacceptably high temperatures on the basin bottom, and produced undesirable solution temperature gradients during operation.

An "active mixing" approach was attempted in order to solve the control difficulties of the passive approaches. The active approach employed a pump to recirculate the solution from the basin, to an external heater, and back into the basin. While this approach did solve many of the problems inherent in the passive approaches, it was quite a bit more expensive and was found to generate a great deal of noise in the operating room. An alteration of this approach employed an air bubbler system to achieve a uniform temperature in the solution.

SUMMARY OF THE INVENTION

In accordance with the present invention, an electrically-heated basin is shaped to promote efficient and consistent convective mixing of the liquid. Specifically, the bottom of the basin, rather than being flat, has a plateau-shaped elevated central region surrounded by a depressed edge region. Also in accordance with the present invention, a consistent efficient thermal relationship is provided between the heating element and the basin by the use of a laminated flexible heater assembly which is directly bonded to the bottom of the basin. The geometry of the laminated flexible heater promotes a temperature gradient of the basin bottom that decreases gradually from the center of the basin bottom to the edge of the basin bottom. This heater assembly is thermally isolated from other surfaces by an enclosing base which provides significant spacing surrounding the heater. The fluid convection is created and managed by the configuration of the heating element and the basin and the temperature gradients created near the center of the basin bottom int he initial warming of the sterile solution create a convective flow resulting in the efficient and uniform mixing of the warmer and cooler portions of the solution.

In accordance with the invention, a microprocessor-based, digitally-adjustable temperature controller supplies current to the heater. Thermistors are used as temperature transducers for the controller. The heater and the transducers are electrically connected to the controller by a disposable cable assembly which may be replaced after each use to maintain a sterile environment.

DESCRIPTION OF THE PRESENT INVENTION

Figure 1:
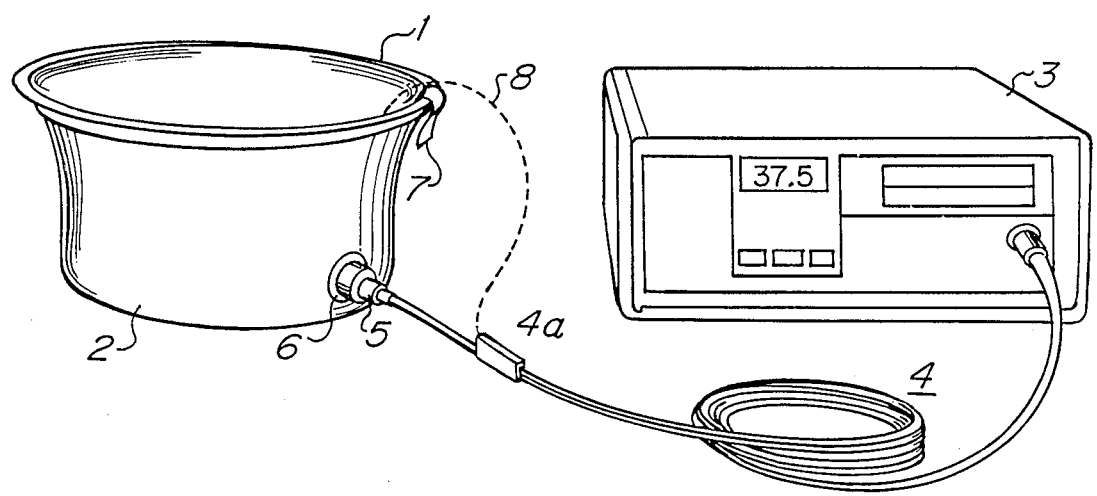
FIG. 1 is a block drawing showing one embodiment of the main elements of the invention.
Figure 2:
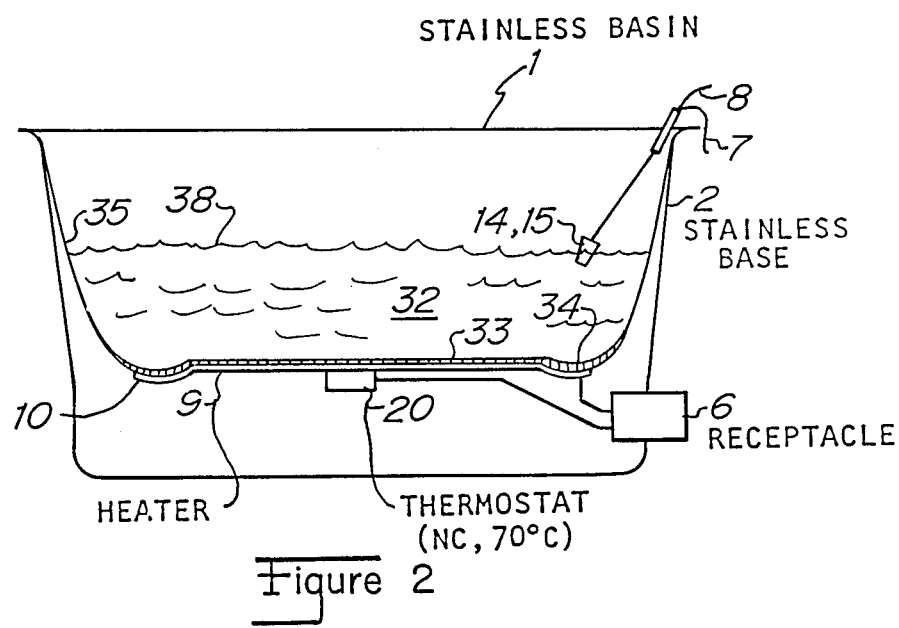
FIG. 2 is a cutaway view of the basin assembly shown in FIG. 1.

FIGS. 1 and 2 show a basin 1 preferrably formed of stainless steel for heating a liquid solution 38. An electrical laminated flexible heater 9 is bonded to the basin bottom 32 by conventional means such as with epoxy glue, or the like. The heater 9 is connected, via a receptacle 6 in the basin base 2 and a cable assembly 4, to an electronic temperature control unit 3. A clip 7 positions the temperature transducer leads 8 such that the temperature transducers 14,15 are immersed in the solution 38 at a fixed depth and distance from the center of the solution to assure repeatable temperature measurements.

In the preferred embodiment, the basin bottom 32 has a flat central region 33 and a depressed edge region 34. This configuration promotes consistent convective flow of solution 38 inside the basin 1. The base 2 is preferrably formed of stainless steel welded to the sides of basin to support the basin 1 and completely surround the heater 9 to form a chamber that is evacuated to reduced air pressure below ambient air pressure. This isolates the heater 9 and the underside of the basin bottom 32 from anything which might cause unexpected temperature variations across the basin bottom, such as air currents or objects contacting the underside of the basin bottom. Such temperature variations could cause the convective flow in the basin to be asymmetrical, with the possible result of uneven temperature distribution within the solution. This design also protects the user from exposure to the heater, allowing the basin bottom to remain relatively cool.

Figure 3:
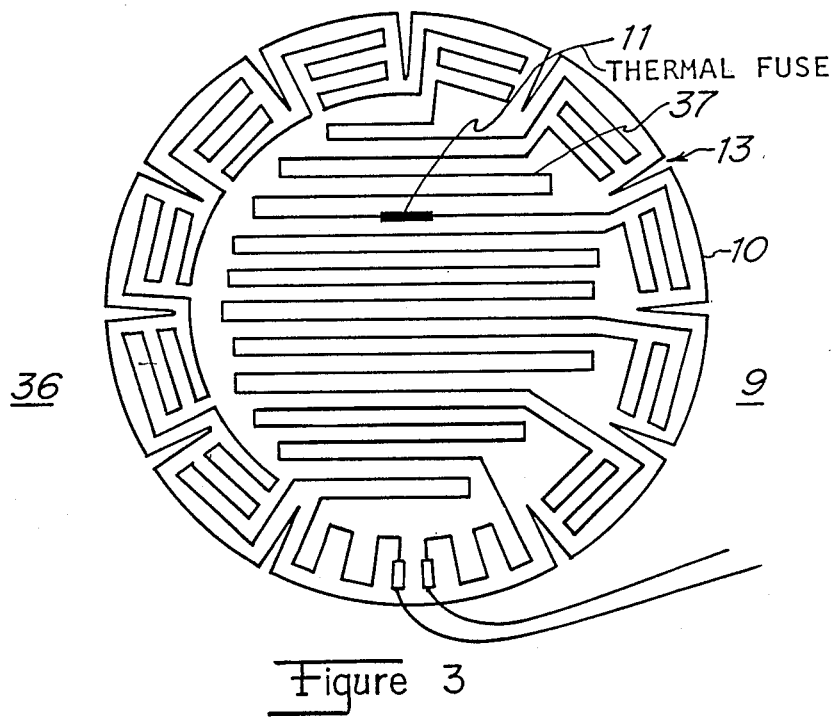
FIG. 3 is a top view of one embodiment of the thin film heater shown in FIG. 2.

FIG. 3 shows the configuration of the flexible laminated heater in the preferred embodiment. The central region 36 of the heater 9 has a substantially uniform distribution of heating traces 37 adhered to a flexible base material such as, for example, Kapton. The central region 36 is surrounded by a number of petals 10 formed by making a number of radial v-cuts 13 into edges of the flexible base material of the heater 9. These petals provide flexibility to the heater 9 and facilitate conformance of the heater 9 to the irregular shape of the basin bottom 32 when bonded to the underside thereof. Within this geometry, there is thus provided a greater density of heating traces 37 within the central region 33 than in the edge region 34 of petals 10. The edge region is also in thermal contact with relatively cooler adjacent basin wall 35. Therefore, there is relatively greater heating in the central region 33 than in the edge region 34. A thermal fuse 11 is provided in the heater 9 to protect against fire and injury by breaking the circuit formed by the trace 37 when the heater temperature exceeds a high threshold that could be detrimental to the heater and adhesive bond, and dangerous to the user. The thermal fuse 11 used in the present embodiment is designed to open at a temperature higher than the temperature at which thermostat 20 operates.

Figure 4:
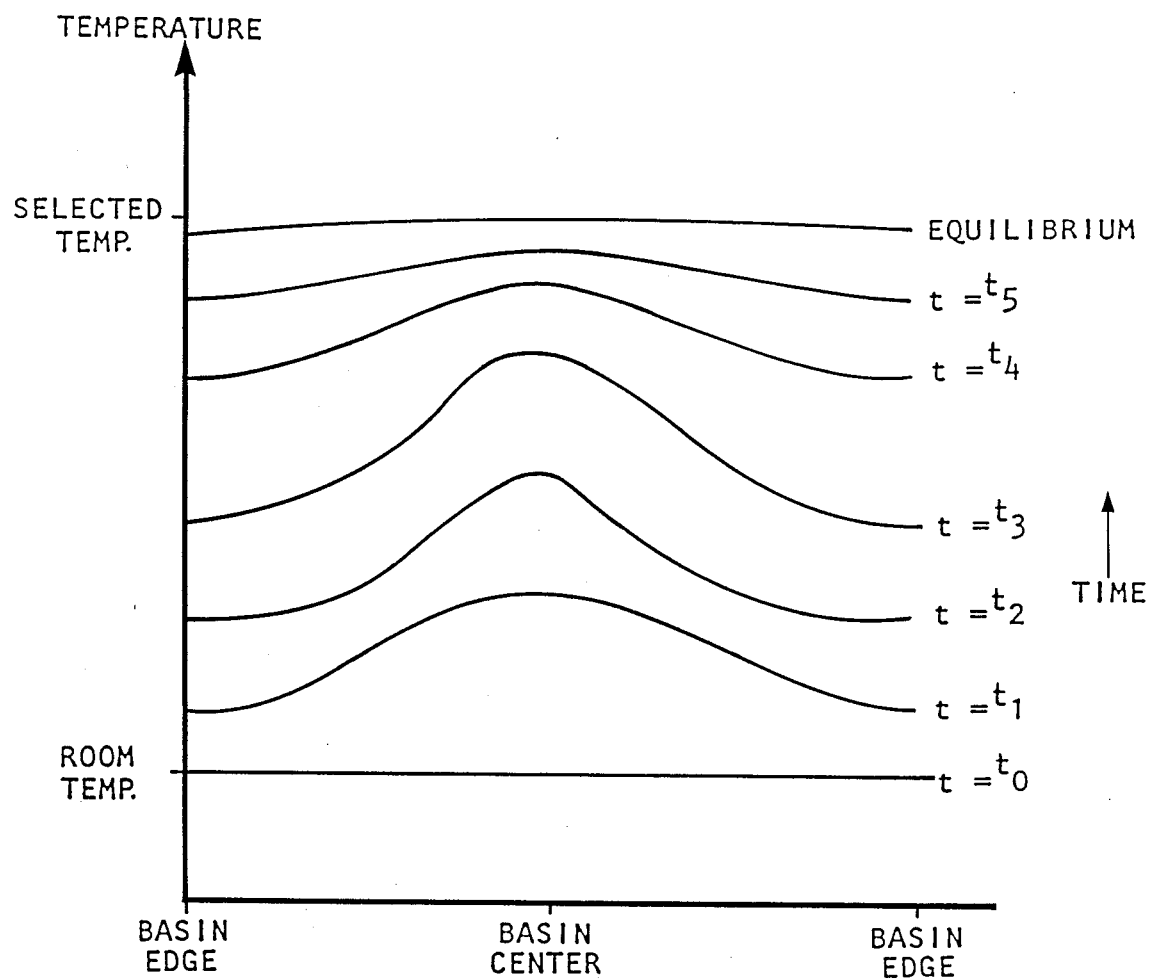
FIG. 4 is a graph of the temperature distribution characteristics of the solution at some elevation across the basin diameter at various stages of warming.

The combination of the heater geometry and the basin shape result in a gradual transition from heat source at the center of the basin bottom 33 to heat sink at the outer edge of the basin bottom 34. When the apparatus is first turned on, the solution adjacent to the center of the basin 33 is warmed most quickly due to the higher density distribution of power-dissipating heater trace 37 in the central region, resulting in an upward convective flow of solution. The cooler solution elsewhere in the basin is urged by this rising central column of warm solution downward and toward the center of the basin bottom. The outer edges of the basin bottom 34, having less heating and being adjacent to the cooler basin walls 35, act as a heat sink, and maintain a well-organized and consistent convective flow. FIG. 4 is a graph showing a family of curves of temperature gradients across the basin diameter at a selected elevation above the basin bottom as such gradients develop and then diminish as a function of time.

Alternatively, a heat flux pattern superior to that of a flat-bottomed basin could also be obtained by other basin bottom geometries, such as an upwardly-peaked arcuate center region arranged to promote a large upward convective flow of solution within the basin.

The present invention also includes a basin bottom cross-section which is thinner near the central region than near the edge region. The thicker material near the edge provides significant thermal mass and conductivity with the relatively cooler basin walls, thus maintaining the edge region as a heat sink for longer than would otherwise be possible. The availability of the edge region as a heat sink is advantageous because this further promotes uniform convective flow from the warmest central region of the basin bottom, vertically up to the solution surface, radially outward to the basin walls, down the walls to the edge region of the bottom, and then back to the central region.

Figure 5:
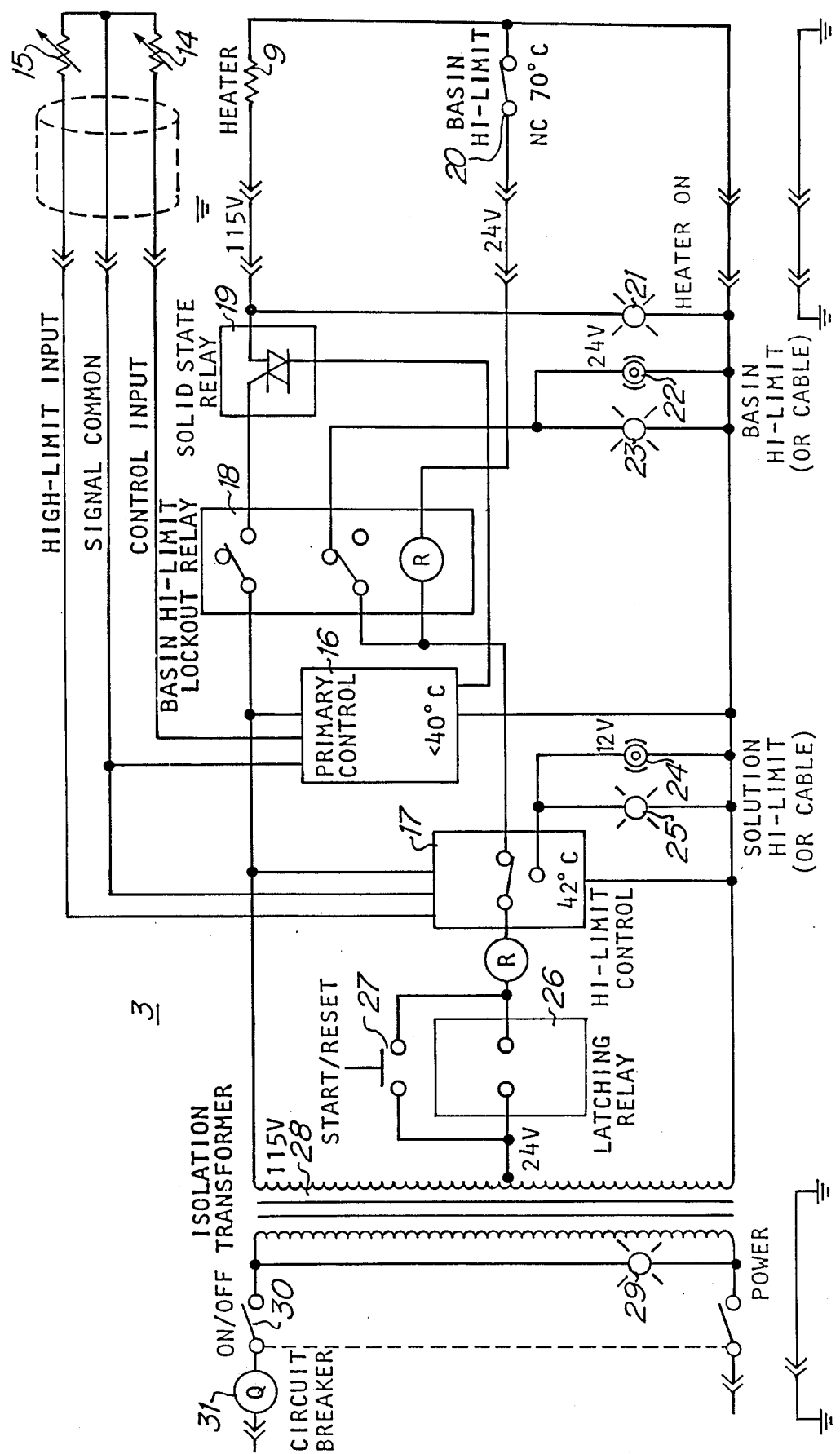
FIG. 5 is a block schematic diagram of the controller shown in FIG. 1.

FIG. 5 shows a schematic block diagram of the temperature controller 3 which includes a microprocessor-based, digitally-adjustable temperature controlling circuitry. The controller is connected to the power mains in a standard fashion via circuit breaker 31, on/off switch 30 with power indicator 29, and isolation transformer 28. The isolation transformer provides both 115 and 24 volts on secondary windings. The 24 volt secondary winding is used to control the relay 18 which is connected to prevent over-temperature operation, and also supplies the high limit control circuitry 17 via a pushbutton "start/reset" switch 27 which momentarily energizes a latching relay 26. The 115 volt secondary winding supplies power to the high limit control circuitry 17, and to the primary control circuitry 16, and the heater 9.

Transducers immersed into the solution provide control signals to the temperature controller which vary proportionally with the temperature of the solution. The transducers of the present invention are thermistors which vary electrical resistance with changes in temperature. Of course, other temperature-sensitive devices such as thermocouples could also be used in the invention. The invention employs two thermistors 14 and 15 to provide a "primary control" signal to indicate when the solution temperature is below that which has been set by the user, and to provide a "high limit" signal that controls cut off of the electrical current to the heater once the solution temperature rises above a threshold. When the resistance of thermistor 15 indicates excessively high temperature, the high limit control circuitry 17 which senses the resistance of thermistor 15 switches power off to the high limit relay 18 and switches power on to the high limit indicator light 25 and audible alarm 24. In one embodiment of the present invention for warming sterile surgical solutions, this high limit may be set at about 42° C. although the high limit could also be set at other desired temperatures. For further protection against overtemperature operation, a thermostat 20 is bonded to the laminated flexible heater 9 and wired into the high-limit control circuitry 17 and relay 18. This thermostat 20 prevents overtemperature operation even in the event that the thermistors 14, 15 are not in the solution 38, or in the event that there is no solution in the basin in contact with the thermistors. For its use as a surgical solution heater, the thermostat is normally closed and is set to open at about 70° C. Of course other, different temperature thresholds could be used. When thermostat 20 opens, the supply of power to the heater is stopped by the relay 18, and the "basin high limit" visual and audible alarms 23, 22 are energized. These alarms may also warn of other problems such as a broken or disconnected cable 4 between the basin 1 and the controller 3. The basin temperature limit alarms also warn of inadequate solution level, since the basin bottom overheats without sufficient solution to absorb the heat produced by the laminated flexible heater. Audible indicators may also be used to signal that the solution has warmed up to the selected temperature. The present invention makes use of audible alarms to signal when either the solution or basin high limit temperatures have been exceeded.

When the resistance of the thermistor for the primary control circuitry indicates that the solution is below the temperature selected by the user, the primary control circuitry turns on the solid state relay 19 to energize the heater 9 and the "heater on" indicator light 21.

Standard circuitry is used to provide an adjustable digital readout of the temperature at which the solution is to be maintained. The present invention, as used for surgical purposes, allows the solution temperatures to be set at temperatures up to 40° C. Of course, the present invention may also be used for different applications, such as photographic development and processing.

The controller circuitry detects temperatures and controls power to the heater in order to regulate solution temperature at the desired set level. Visual indicators are provided to indicate when the heater is on, when the solution is over-temperature, and when the basin is over temperature. Other temperature-controlled heater circuits may also be used to assure proper regulation of temperature of the solution in the basin.

Standard engineering practices are employed in the present embodiment to ensure conformity with hospital-grade materials and specifications for electronic equipment. Sterility may be maintained in the present invention by integrating the basin 1 and the base 2 into one polished stainless steel unit which can easily be cleansed and which has no crevices or the like to hinder complete sterilization. The laminated flexible heater 9 is thus completely enclosed by the basin 1 and the base 2. Electrical connection with the heater 9 is provided by a hospital grade receptacle 6 which is flush with the surface of the base 2. The thermistors 14, 15 are maintained in contact with the solution 38 by means of a removable clip 7 which fits over the top edge of the basin 1. Both the thermistor and the heater connections are removable, and the electrical connections at the controller end of the cable are removable. As a result, the entire cable assembly 4 connecting the basin 1 to the controller 3 may be removed and either sterilized or discarded after use. The simple thermistor control scheme facilitates integration of the thermistors into the cable assembly 4 which may be cost-effectively discarded after each use. The cable 4 is of sufficient length that the controller need not be placed within the sterile surroundings of the basin. The cable 4 contains a Y-connector 4a which separates the thermistor leads 8 from the heater power leads at the basin bottom. Such a configuration with a plug at the connector allows use of a separate disposable thermistor lead 8, if so desired.

In operation, a perforated platform (not shown) may be disposed within the basin at an elevation above the basin bottom to prevent elements to be warmed (e.g., parcels of solutions, tissue materials, utensils, and the like) from resting directly on the bottom of the basin. Such platform may be supported above the bottom by legs depending from the platform and resting on the bottom, or by hangers attached to the platform and disposed to wrap over the rim of the basin. In addition, the sterility and elevated temperature of solution in the basin may be preserved for a longer period by a cover (not shown) that is disposed to form a substantially air-tight seal about the rim of the basin. Alternatively, the elevated temperature of solution in the basin may be preserved by including a cover that floats on the surface of solution in the basin, and that is formed of buoyant, foam-type material that is substantially impervious to liquid such as polystyrene or polyurethane which can float on the liquid as a mat or layer. Further, the elevated temperature of liquid in the basin is preserved by forming the base of the basin in air-tight and evacuated relationship with the basin. This also assures that the base of the basin remains cool in operation, thereby diminishing the danger of burning material on which the basin is placed, and thereby also diminishing the danger of burning the user, particularly as the heater initially heats liquid and operates at its maximum temperature. These operating characteristics of the basin of the present invention are substantially preserved for basins of larger liquid volumes and for basins operating with partial volumes of liquid.

What is claimed is:
1. Apparatus for heating a liquid comprising:
a basin for holding a liquid, the basin having a bottom portion and a side wall portion, and the bottom portion having a non-planar shape including a central elevated region and a depressed edge region of thicker material than the material in the central elevated region;
a heater assembly attached to the underside of the basin bottom for providing greater heat in the central region of the basin bottom than along the edge region of the basin bottom;
a base fixedly attached to the side wall portion of the basin spaced away from the heater assembly on the basin bottom; and
means for supplying and controlling electrical current through the heater assembly for heating liquid in the basin substantially in the central elevated region and additionally in the edge region of the basin to produce convective circulation of liquid in the basin.

* * * * *